(12) United States Patent
Burkman et al.

(10) Patent No.: US 9,972,815 B2
(45) Date of Patent: May 15, 2018

(54) TRACTION BATTERY SPACER WITH RETENTION ELEMENT

(71) Applicant: FORD GLOBAL TECHNOLOGIES, LLC, Dearborn, MA (US)

(72) Inventors: Wesley Burkman, Dearborn, MI (US); Francisco Fernandez, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 849 days.

(21) Appl. No.: 14/173,448

(22) Filed: Feb. 5, 2014

(65) Prior Publication Data
US 2015/0221915 A1 Aug. 6, 2015

(51) Int. Cl.
| | | |
|---|---|---|
| *H01M 2/14* | (2006.01) | |
| *H01M 2/20* | (2006.01) | |
| *H01M 10/48* | (2006.01) | |
| *H01M 2/10* | (2006.01) | |

(52) U.S. Cl.
CPC .......... *H01M 2/14* (2013.01); *H01M 2/1077* (2013.01); *H01M 2/206* (2013.01); *H01M 10/486* (2013.01); *H01M 2200/108* (2013.01); *H01M 2220/20* (2013.01)

(58) Field of Classification Search
None
See application file for complete search history.

(56) References Cited

U.S. PATENT DOCUMENTS

| | | |
|---|---|---|
| 2005/0250006 A1 | 11/2005 | Kim |
| 2008/0090137 A1 | 4/2008 | Buck et al. |
| 2009/0155680 A1 | 6/2009 | Maguire et al. |
| 2012/0110810 A1* | 5/2012 | Houser ............ A61B 17/00234 29/271 |
| 2012/0183823 A1 | 7/2012 | VonBorck et al. |
| 2013/0164595 A1 | 6/2013 | Takase et al. |
| 2013/0309539 A1* | 11/2013 | Yoshioka ............... H01G 11/52 429/99 |

FOREIGN PATENT DOCUMENTS

| | | | | |
|---|---|---|---|---|
| WO | WO 2012120091 A1 * | 9/2012 | .......... | H01M 2/1077 |
| WO | WO 2013000908 A1 * | 1/2013 | .......... | H01M 2/1077 |

* cited by examiner

*Primary Examiner* — Barbara L Gilliam
*Assistant Examiner* — Zhongqing Wei
(74) *Attorney, Agent, or Firm* — David B. Kelley; Brooks Kushman P.C.

(57) ABSTRACT

A battery assembly includes a plurality of cells stacked to form an array and a plurality of spacers each disposed between an adjacent pair of the cells. Each cell includes at least one terminal. Each of the spacers includes a retainer extending from an edge portion of the spacer. The retainers are configured to orient and engage a busbar for connecting the terminals of an adjacent pair of cells. The battery assembly may also include a busbar module. The busbar module may engage with the retainers to hold the busbar module to the array.

11 Claims, 5 Drawing Sheets

TRACTION BATTERY SPACER WITH RETENTION ELEMENT

TECHNICAL FIELD

This disclosure relates to battery cell spacers for vehicle battery assemblies.

BACKGROUND

Vehicles such as battery-electric vehicles (BEVs), plug-in hybrid electric vehicles (PHEVs) or hybrid-electric vehicles (HEVs) contain a battery assembly with a traction battery to act as an energy source for the vehicle. The battery assembly may include components and systems to interact with the battery and assist in managing vehicle performance and operations. The battery may include one or more arrays of battery cells with the cell terminals interconnected electrically with busbars.

SUMMARY

A battery assembly includes a plurality of cells stacked to form an array. Each cell includes a terminal. The assembly also included a plurality of spacers each disposed between an adjacent pair of the cells and each including a retainer extending from an edge portion of the spacer. Each of the retainers is configured to orient and engage a busbar connecting the terminals of an adjacent pair of the cells.

A battery assembly includes a plurality of cells stacked to form an array. Each cell includes a terminal. The assembly also includes a plurality of spacers each disposed between an adjacent pair of the cells and including a retainer extending from an edge portion of the spacer, and at least one busbar module. The busbar module includes a housing configured to protect and align a plurality of busbars, and a flap attached to the housing. The flap is configured to engage a corresponding retainer to secure the flap against a corresponding cell.

A battery assembly includes a plurality of cells stacked to form an array having first and second terminal rows, and a plurality of spacers each disposed between an adjacent pair of the cells and including a clip extending from an edge portion of the spacer. The assembly also includes a busbar module including first and second side portions interconnected by a middle portion. Each of the side portions is disposed over one of the first and second terminal rows and includes at least one busbar electrically connecting two adjacent terminals in the corresponding terminal row. The middle portion defines a plurality of slots. Each of the slots receives a corresponding clip therethrough to secure the busbar module to the array.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
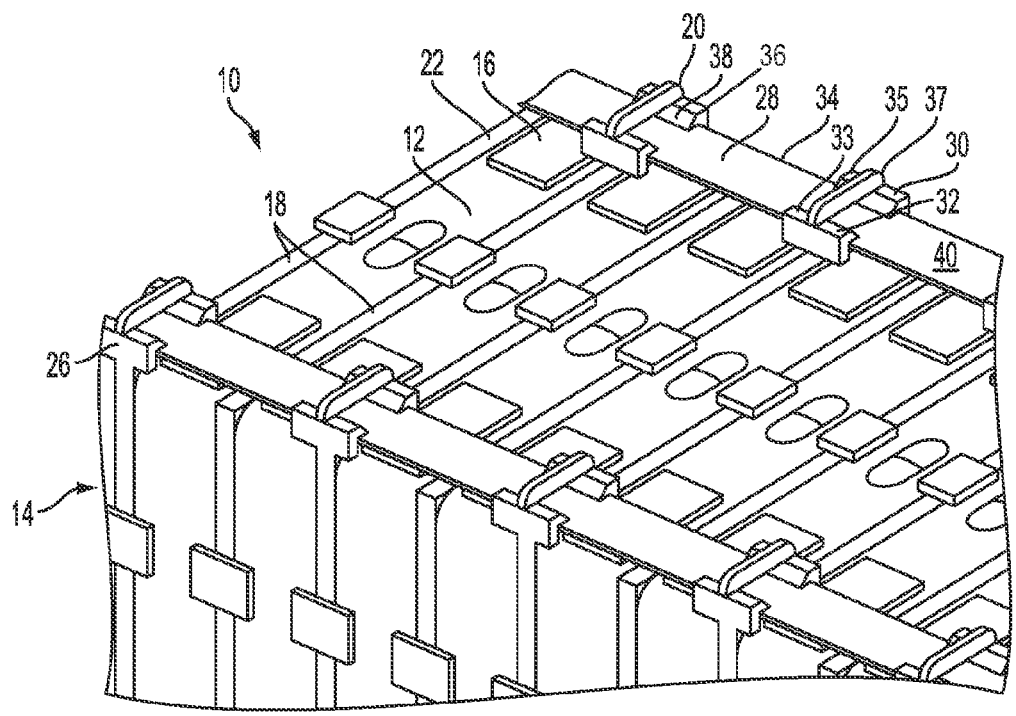
FIG. 1 is a perspective view of a battery assembly.

Referring to FIG. 1, a battery assembly 10 is shown. The battery assembly 10 includes a plurality of battery cells 12 stacked to form a battery array 14. Each of the battery cells 12 includes positive and negative terminals 16. A plurality of spacers 18 are provided between adjacent pairs of the cells 12. The spacers may provide electrical isolation and/or cooling between adjacent cells. Each spacer 18 includes a retainer 20. The retainer 20 may be connected to the edge portion 22 at a corner 26 of the spacer 18. The spacers 18 may be arranged such that the retainers 20 on adjacent spacers 18 are on opposing corners of their corresponding spacer 18 such that the retainers 20 alternate along the array 14. For example, a first spacer has the retainer 20 attached on a left corner of the spacer and an adjacent spacer has the retainer 20 on the right corner.

The retainers 20 are for securing a plurality of busbars 28 to the battery array 14. Including the busbar retention device (i.e. retainer 20) on the spacer may reduce the need for other busbar attachment components. This may reduce production costs and increase manufacturing efficiencies. Each busbar 28 electrically connects adjacent positive and negative terminals 16. Each of the retainers 20 engages with at least one busbar 28 to secure the at least one busbar 28 to the terminals 16. Each retainer 20 may include a first clip 30 and a second clip 32. The first and second clips 30, 32 are disposed on opposing sides of the retainer 20 with the first clip 30 being nearer to the corner than the second clip 32. The first and second clips 30, 32 engage with opposing longitudinal sides 34 of the busbar 28 and cooperate to secure one end of the busbar 28 to the corresponding terminals. A retainer 20 located in the interior of the battery array 14 may additionally include a third clip 33 and a fourth clip 35. The third and fourth clips 33, 35 are identical to the first and second clips 30, 32. The third and fourth clips 33, 35 engage with opposing longitudinal sides 34 of another busbar 28 and cooperate to secure one end of that busbar to the corresponding terminals. A separator 37 is disposed between the two sets of clips to prevent adjacent busbars 28 from short circuiting. Each clip 30, 32, 33, 35 includes a body portion 36 that is attached to the edge portion 22 of the spacer 18 and projection 38 that extends away from the body portion 36.

The projection 38 is configured to engage with a top side 40 of the busbar 28 when the busbar 28 is installed on the battery array 14.

Figure 2:
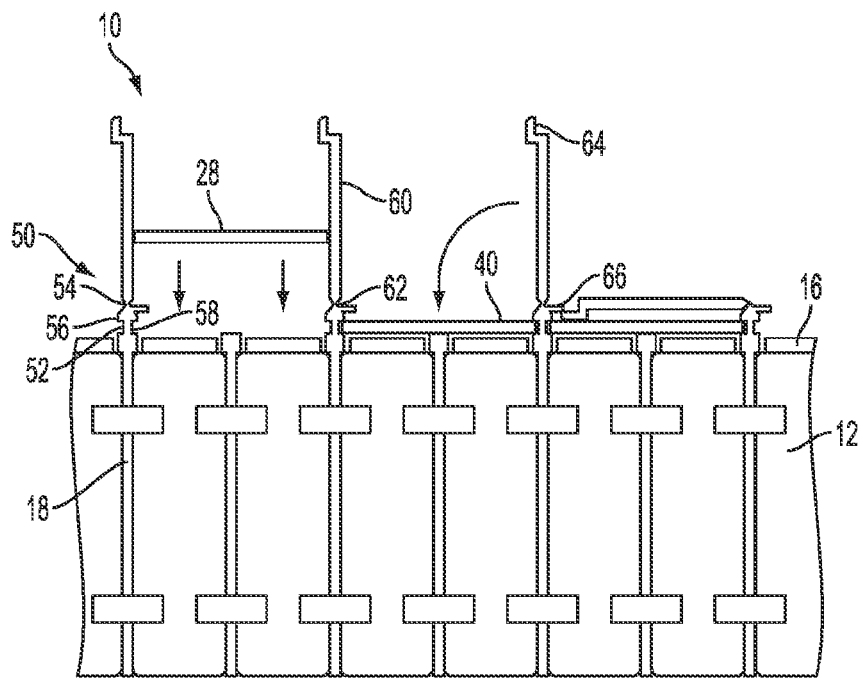
FIG. 2 is a side view of the battery assembly shown in FIG. 1 with a different retainer.

FIG. 2 illustrates an alternative retainer design for the battery assembly 10. Each retainer 50 includes a body portion 52 and a head portion 54. The body portion 52 connects to the spacer 18 at the edge portion 22. The head portion 54 is disposed on the body portion 52 opposite the edge portion 22. The head portion 54 includes at least one projection 56. The projection 56 and the body portion 52 cooperate to define a slot 58. The slot 58 receives a portion of the busbar 28 to secure one end of the busbar 28 to the array 14. A flap 60 may be attached to the head portion 54 via a living hinge 62. The flaps 60 provide finger protection for the busbars 28. The flaps 60 are pivotable between open and closed positions. Each retainer 50 also includes a snap 66. The snap 66 is disposed on the head portion 54. A distal end 64 of the flap 60 engages with the snap 66 of an adjacent retainer 50 when the flap 60 is in the closed position.

Figure 3:
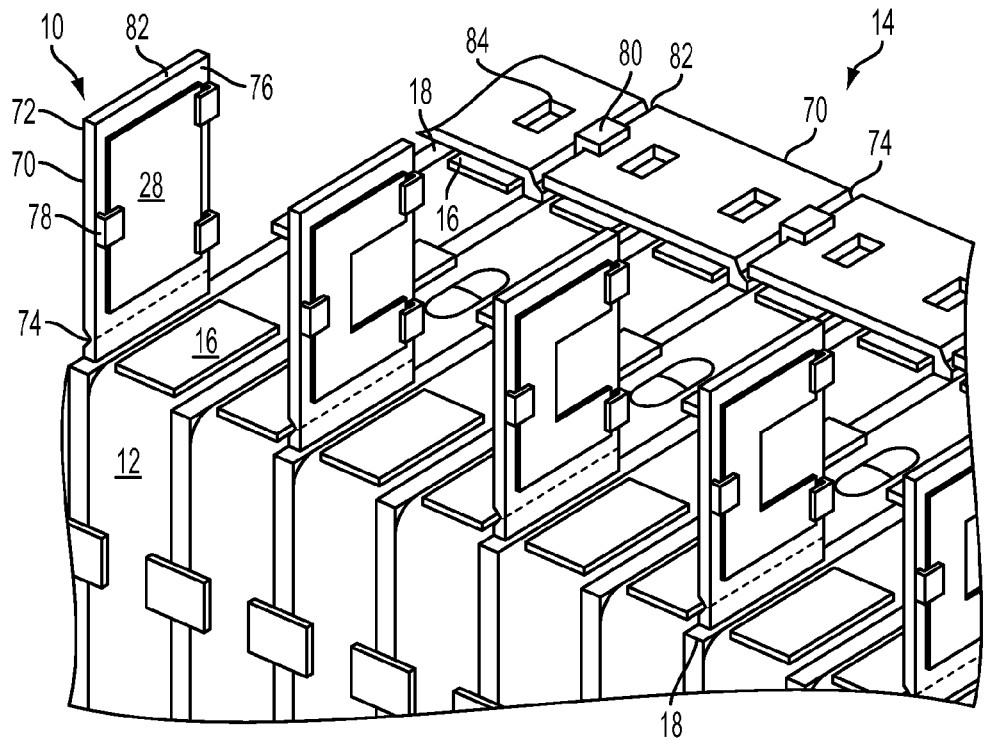
FIG. 3 is a perspective view of the battery assembly shown in FIG. 1 with another different retainer.

FIG. 3 illustrates a battery assembly 10 having another alternative retainer design. As previously described the battery assembly 10 includes a plurality of battery cells 12 stacked to form an array 14 and a plurality of spacers 18 disposed between the cells 12. Each spacer 18 includes a retainer 70 attached at the edge portion 22. Each retainer 70 includes a flap 72. The flap 72 is pivotable about a hinge 74. The hinge 74 may be a living hinge. The flap 72 includes a bottom surface 76. The bottom surface 76 has a plurality of clips 78. The clips 78 are configured to receive and secure a corresponding busbar 28 to the bottom surface 76 of the flap 72. The busbar is an electrically conductive material, such as a piece of copper and/or aluminum. The busbar may be in any suitable shape such a rectangle or a "U"-shape. FIG. 3 illustrates one rectangular busbar and four "U"-shaped busbars, however it is to be understood that any combination of different shaped busbars may be used. Alternatively, all of the busbars 28 may be the same shape. The flap 72 is movable between an open position and a closed position. In the open position, the busbar 28 is not in contact with corresponding terminals 16 and in the closed position, the busbar 28 is in contact with the terminals 16. The flaps 72 provide finger protection over the busbar 28 to limit unwanted contact with the busbars 28. Each retainer 70 also includes a snap 80. The snap 80 is disposed on the retainer 70 proximate the hinge 74. A distal end 82 of the flap 72 engages with the snap 80 of an adjacent retainer 70 when the flap 72 is in the closed position. The adjacent retainer may be connected to a spacer 18 that is located two spacers away. Apertures 84 may be provided through each flap 72 to allow welding of the busbars 28 to the terminals 16.

Figure 4:
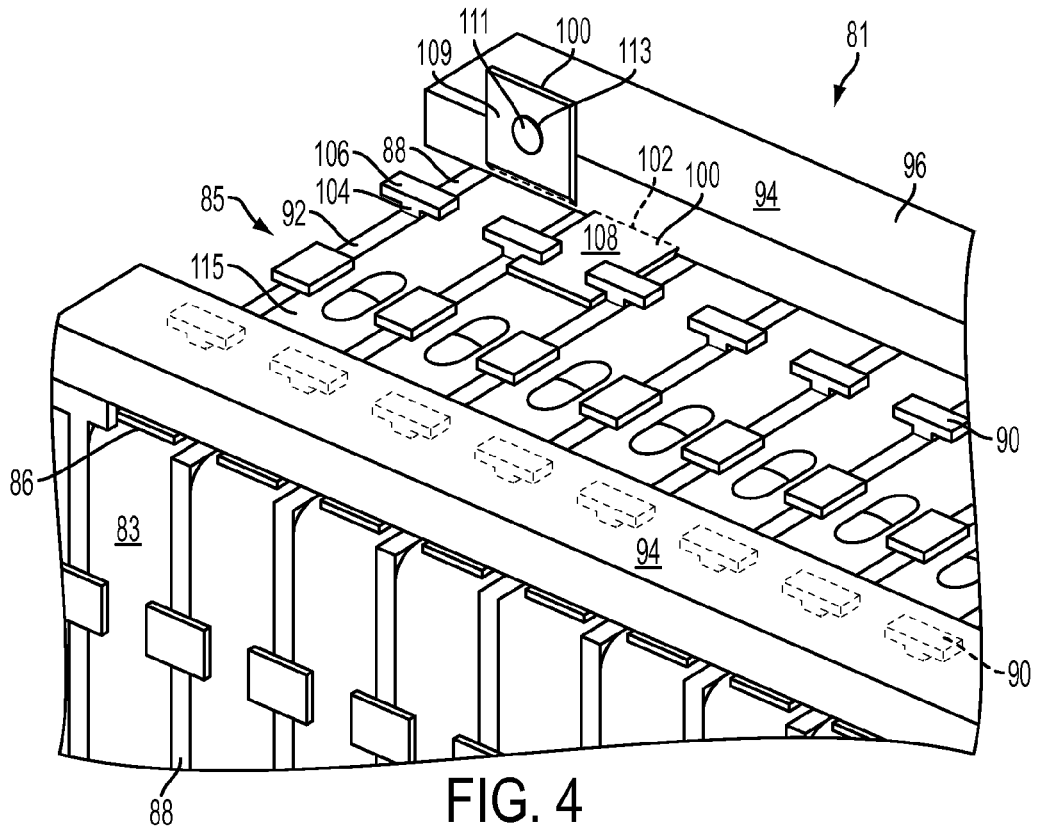
FIG. 4 is a perspective view of a battery assembly including a busbar module.

Referring to FIG. 4, a battery assembly 81 is shown. The battery assembly 81 includes a plurality of battery cells 83 stacked to form a battery array 85. Each of the battery cells 83 includes positive and negative terminals 86. A plurality of spacers 88 are provided between adjacent pairs of cells 83. Each spacer 88 includes a pair of retainers 90 located on opposite sides of a centerline of the battery array 85. Each retainer 90 is connected to the edge portion 92 of the spacer 88. Each retainer 90 includes a body portion 104 that is attached to the spacer 88 and at least one finger portion 106 that extends outwardly from the body portion 104. Retainers 90 on interior spacers 88 may include two finger portions 106 that extend in opposite directions. The finger portion(s) 106 may be oriented to extend away from the body portion 104 transverse to the longitudinal axis of the edge portion.

A pair of busbar modules 94 is attached to the battery array 85. Each busbar module 94 is disposed over a corresponding row of terminals. Each busbar module 94 includes a housing 96 for protecting and aligning a plurality of busbars 98. Each busbar module 94 also includes a plurality of flaps 100 that are pivotable about a living hinge 102 on the housing 96. The flaps 100 snap into the finger portions 106 of the retainers 90 to secure the flaps 100 against the cells 83. The flaps 100 and retainers 90 may also secure and align the busbar modules 94 to the array 85. Each flap 100 includes a first surface 108 and a second surface 109. The first surface 108 is configured to engage with the finger portions 106 of two adjacent spacers 88. The second surface 109 is configured to be disposed against a top side 115 of a corresponding cell 83. A temperature sensor 111 may be provided in the flap 100. A temperature sensor 111 may be provided in all of the flaps 100 or may only be provided in select flaps. A sensor head 113 of the temperature sensor 111 is disposed on the second surface 109 and is in contact with the top side 115 of the cell 83. The temperature sensor 111 may be a thermistor. Cell temperature sensors function more accurately when held in contact with a portion of the cell. By providing the temperature sensor in the flap 100 and securing the flap 100 against the cell 83 with the retainer 90, additional locating components, such a spring feature on the temperature sensor may be omitted. This may reduce temperature sensor costs and increase production efficiencies.

Figure 5A:
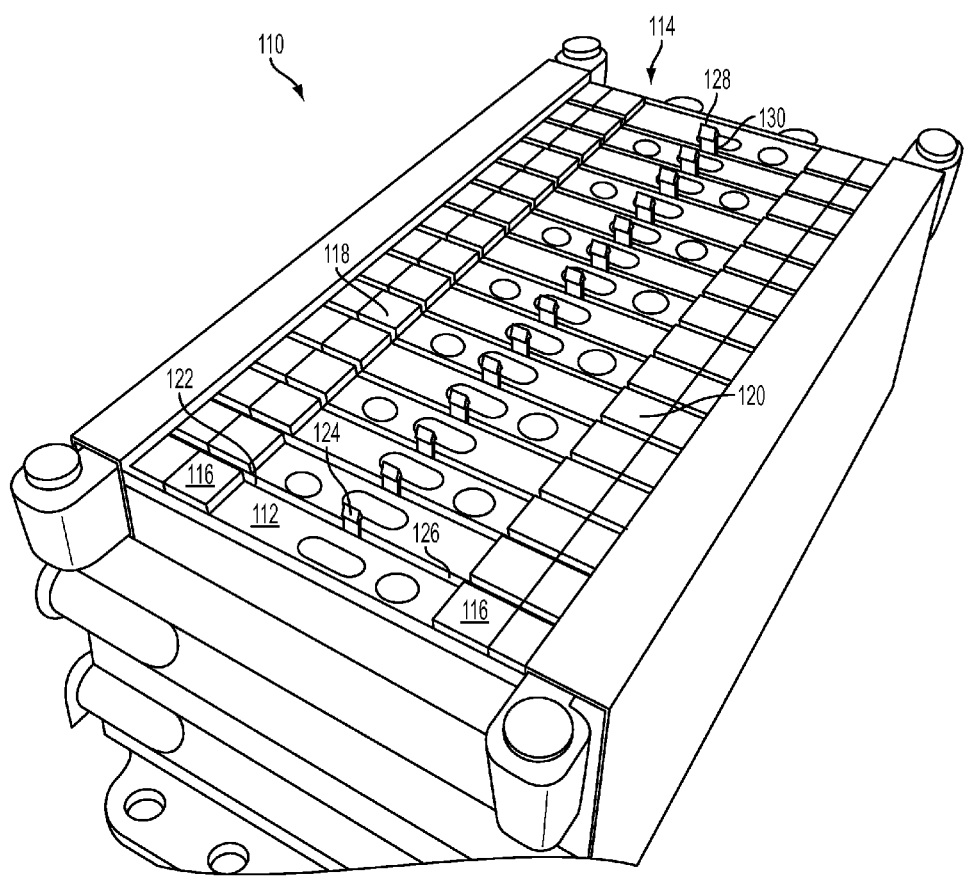
FIG. 5A is a perspective view of another battery assembly including a busbar module.
Figure 5B:
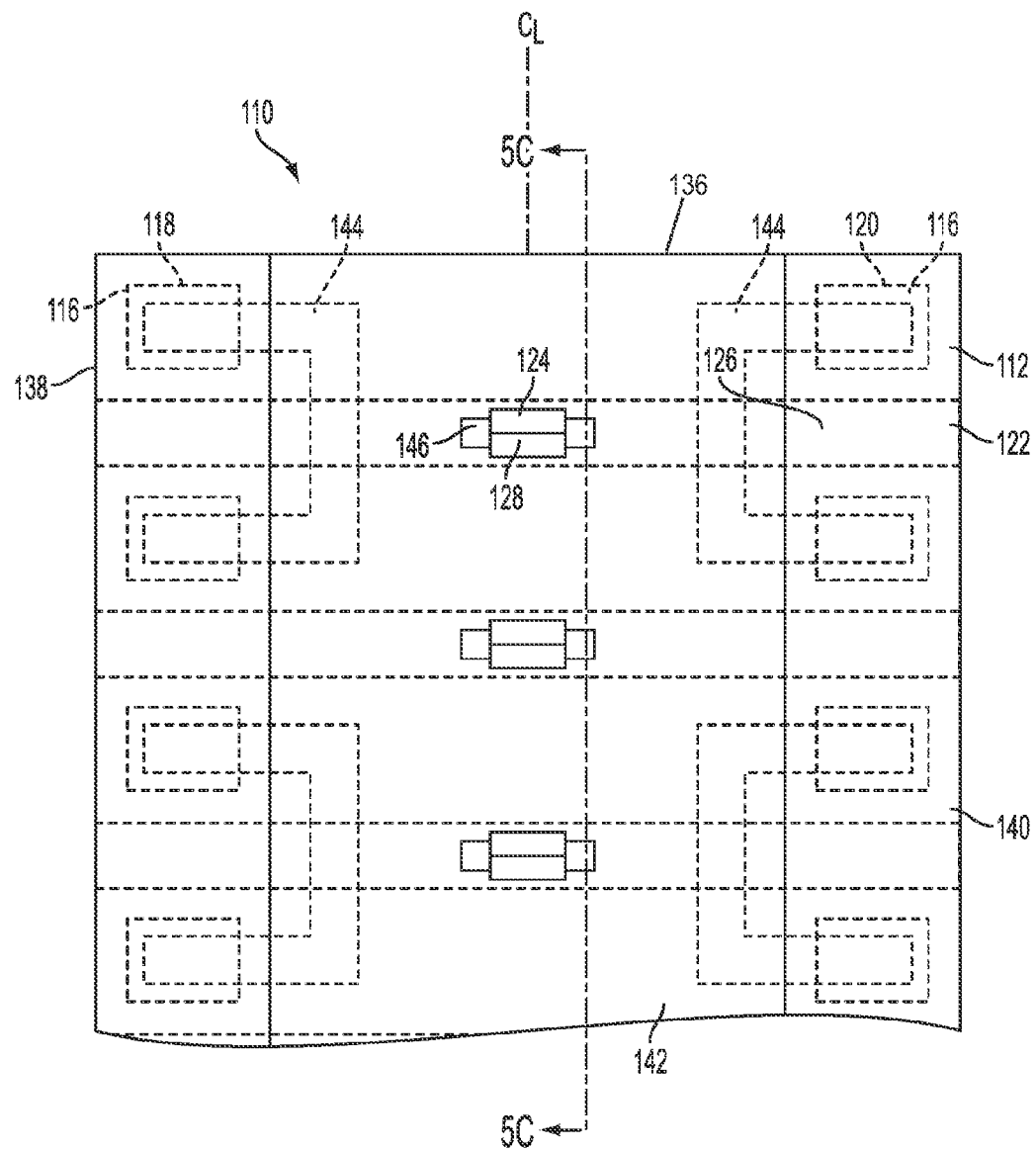
FIG. 5B is a top view of the battery assembly shown in FIG. 5A.
Figure 5C:
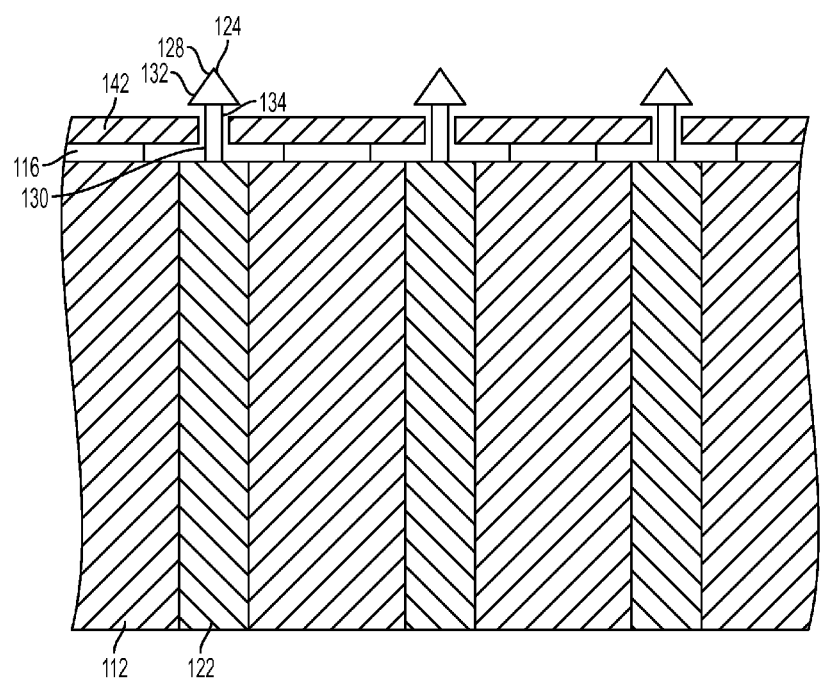
FIG. 5C is a section view of the battery assembly shown in FIGS. 5A and 5B along cut line 5C-5C.

Referring to FIGS. 5A to 5C, a battery assembly 110 is shown. The battery assembly 110 includes a plurality of battery cells 112 stacked to form a battery array 114. Each of the battery cells 112 includes positive and negative terminals 116. The positive and negative terminals 116 define a first terminal row 118 and a second terminal row 120. A plurality of spacers 122 are provided between adjacent pairs of cells 112. Each spacer 122 includes a clip 124 attached to the spacer 122 at an edge portion 126. The clip 124 may be attached to the edge portion 126 at a center point of the spacer 122. Each clip 124 includes a head portion 128 and a neck portion 130. The neck portion 130 is attached to the spacer 122. The head portion 128 is attached to the neck portion 130 opposite the edge portion 126. The head portion 128 may be tapered having an arrow head cross-section and include a projection 132 that extends away from the neck portion 130. The head portion 128 and neck portion 130 cooperate to define a notch 134.

A busbar module 136 is attached to the battery array 114. The busbar module 136 includes a first side portion 138 and a second side portion 140. The first and second side portions 138, 140 are interconnected by a middle portion 142. The first side portion 138 is disposed over the first terminal row 118. The second side portion 140 is disposed over the second terminal row 120. A plurality of busbars 144 is disposed within the first and second side portions 138, 140 of the busbar module 136. The busbars 144 electrically connect two adjacent terminals 116. The middle portion 142 defines a plurality of slots 146. The slots 146 receive the clips 124 therethrough to secure the busbar module 136 to the battery array 114. The head portion 128 is tapered to allow the busbar module 136 to be pushed onto the clip 124. Once pushed on, the notch 134 engages with the busbar module 136 to secure the busbar module 136 to the array 114. The location of the clips 124 and the slots 146 are predefined and help align the busbar module 136 on the battery array 114. The busbar module 136 may include a plurality of apertures in the first and second side portions 138, 140 to allow access to weld the busbars 144 to corresponding terminals 116.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A battery comprising:
cells stacked in an array;
spacers interleaved with the cells;
a retainer attached to one of the spacers and defining a slot;
a busbar disposed in the slot; and
a flap directly connected to the retainer via a hinge and pivotable between an open position in which the flap is parallel with the retainer and a closed position in which the flap is folded over the busbar and perpendicular with the retainer.

2. The battery of claim 1 further comprising a second retainer connected to another of the spacers and defining a second slot, wherein the busbar is disposed in the second slot.

3. The battery of claim 2, wherein a distal end of the flap is connected to the second retainer when in the closed position.

4. The battery of claim 3, wherein the second retainer further includes a snap that engages the distal end to secure the flap in the closed position.

5. The battery of 2, wherein the retainers are positioned on opposite longitudinal sides of the array.

6. The battery of claim 1, wherein the hinge is a living hinge that is integrally formed with the flap and the retainer.

7. The battery of claim 1 further comprising a terminal extending from one of the cells, wherein the busbar is sandwiched between the terminal and the flap when the flap is in the closed position.

8. A battery assembly comprising:
battery cells each including terminals and stacked to form an array;
a plurality of spacers each disposed between an adjacent pair of the cells;
a plurality of retainers each extending from an edge portion of a corresponding one of the spacers, each of the retainers including:
a body portion connected to the edge portion,
a head portion spaced from, and cooperating with, the body portion to define a slot, and
a flap pivotably attached to the head portion via a living hinge and pivotable between an open position and a closed position, wherein the array is arranged so that retainers on adjacent spacers are located on opposing longitudinal sides of the array with the retainers alternating along a length of the array and with an adjacent pair of the retainers sandwiching an adjacent pair of the terminals; and
a busbar disposed against the pair of the terminals and having a first end disposed in the slot of one of the retainers of the adjacent pair of the retainers and a second end disposed in the slot of the other of the retainers of the adjacent pair of the retainers, and wherein the flap is folded over the busbar and spans the adjacent pair of the terminals when in the closed position.

9. The battery assembly of claim 8, wherein the flap further includes a distal end connected to the other of the retainers of the adjacent pair of the retainers when the flap is in the closed position.

10. The battery assembly of claim 9, wherein the other of the retainers of the adjacent pair of the retainers further includes a snap that engages with the distal end when the flap is in the closed position.

11. The battery assembly of claim 8, wherein the flap is parallel with the body portion when in the open position and is perpendicular with the body portion when in the closed position.

* * * * *